United States Patent
Ichioka et al.

(10) Patent No.: US 9,905,863 B2
(45) Date of Patent: Feb. 27, 2018

(54) SEPARATOR FOR FUEL CELL AND MANUFACTURING METHOD OF FUEL CELL STACK

(71) Applicant: TOYOTA JIDOSHA KABUSHIKI KAISHA, Toyota-shi, Aichi-ken (JP)

(72) Inventors: Tadahiro Ichioka, Kasugai (JP); Chisato Kato, Aichi-ken (JP); Fumishige Shizuku, Seto (JP); Kenji Sato, Kasugai (JP); Takuya Kurihara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/771,654

(22) PCT Filed: Oct. 29, 2014

(86) PCT No.: PCT/JP2014/005467
§ 371 (c)(1),
(2) Date: Aug. 31, 2015

(87) PCT Pub. No.: WO2015/072097
PCT Pub. Date: May 21, 2015

(65) Prior Publication Data
US 2016/0344043 A1  Nov. 24, 2016

(30) Foreign Application Priority Data

Nov. 15, 2013 (JP) .................... 2013-236545

(51) Int. Cl.
*H01M 8/0271* (2016.01)
*H01M 8/241* (2016.01)
(Continued)

(52) U.S. Cl.
CPC ....... *H01M 8/0271* (2013.01); *H01M 8/0258* (2013.01); *H01M 8/0267* (2013.01);
(Continued)

(58) Field of Classification Search
CPC ............ H01M 8/0271; H01M 8/2483; H01M 8/0258; H01M 8/0267; H01M 8/241; H01M 8/2465
See application file for complete search history.

(56) References Cited

FOREIGN PATENT DOCUMENTS

| JP | 2000-330122 | 11/2000 |
|----|-------------|---------|
| JP | 2009-110822 | 5/2009 |

(Continued)

*Primary Examiner* — Helen O Conley
(74) *Attorney, Agent, or Firm* — Finnegan, Henderson, Farabow, Garrett & Dunner, LLP (57) ABSTRACT

A separator for fuel cell is used for a fuel cell and is placed to face a membrane electrode assembly. The separator includes a separator center area placed to face a power generation area of the membrane electrode assembly; a peripheral region extended from the separator center area toward an outer edge; a cooling medium supply manifold and a cooling medium discharge manifold provided in the peripheral region; a fluid flow path area extended from the cooling medium supply manifold through the separator center area to the cooling medium discharge manifold; a sealing gasket provided in the peripheral region and placed to surround the fluid flow path area; and a gasket for peel test provided outside of the fluid flow path area and configured to receive an external force applied as a test for evaluation of an adhesive state of the gasket. Evaluating the adhesive state of the gasket for peel test improves the yield of products in manufacture of the separators for fuel cell.

4 Claims, 5 Drawing Sheets

(51) Int. Cl.
  *H01M 8/0267* (2016.01)
  *H01M 8/2465* (2016.01)
  *H01M 8/0258* (2016.01)
  *H01M 8/0276* (2016.01)
  *H01M 8/2483* (2016.01)
  *H01M 8/1018* (2016.01)

(52) U.S. Cl.
  CPC ......... *H01M 8/0276* (2013.01); *H01M 8/241* (2013.01); *H01M 8/2465* (2013.01); *H01M 8/2483* (2016.02); *H01M 2008/1095* (2013.01); *Y02P 70/56* (2015.11)

(56) References Cited

FOREIGN PATENT DOCUMENTS

| | | |
|---|---|---|
| JP | 2013-069648 A | 4/2013 |
| JP | 2014-82034 | 5/2014 |

Fig.4C

SEPARATOR FOR FUEL CELL AND MANUFACTURING METHOD OF FUEL CELL STACK

CROSS-REFERENCE TO RELATED APPLICATIONS

This application is a national phase application of International Application No. PCT/JP2014/005467, filed Oct. 29, 2014, and claims the priority of Japanese Application No. 2013-236545, filed Nov. 15, 2013, the content of both of which are incorporated herein by reference.

TECHNICAL FIELD

The present invention relates to a separator for fuel cell and a manufacturing method of a fuel cell stack.

BACKGROUND ART

A fuel cell stack generally has a configuration by stacking a plurality of membrane electrode assemblies via separators. The separators are provided to cause the respective stacked membrane electrode assemblies to be separated from one another as power generation units and to be electrically in direct connection with one another. Accordingly, each separator is placed between adjacent membrane electrode assemblies, such that the respective surfaces of the separator face an anode side and a cathode side of the adjacent membrane electrode assemblies. A reaction gas supply flow path for supply of a reaction gas (the air or hydrogen gas) is formed between the separator and the membrane electrode assembly. A seal line is formed around the periphery outside of the reaction gas supply flow path to prevent leakage of the reaction gas or a coolant. The seal line is generally formed by providing a gasket. The gasket has one end bonded to the separator and the other end pressed against the membrane electrode assembly, so as to prevent leakage of the reaction gas or the coolant. The process of manufacturing the fuel cell stack may perform not only a test for leakage of the reaction gas or the coolant from this seal line but a test for the adhesive state of the gasket forming the seal line. Patent Literature 1 proposes a non-destructive test for the gasket. A destructive test may, on the other hand, be performed to sample some of separators provided for producing the fuel cell stack and evaluate the sampled separators for whether the gasket is peeled off or what magnitude of force is required to peel off the gasket.

CITATION LIST

Patent Literature

PTL 1: JP 2009-110822A

SUMMARY

Technical Problem

The destructive test, however, breaks the gasket of the tested separator and accordingly does not allow the tested separator to be used as the product. This leads to a problem of the reduced yield of products. Other needs for the prior art separator for fuel cell include easy manufacture and resource saving.

Solution to Problem

In order to solve at least part of the problems described above, the invention may be implemented by the following aspects.

(1) According to one aspect of the invention, there is provided a separator for fuel cell that is used for a fuel cell and is placed to face a membrane electrode assembly. The separator for fuel cell may comprise a gasket that is bonded to a position surrounding a fluid flow path area, in which a flow path for a fluid is formed, on a surface of the separator to seal the fluid flow path area from the membrane electrode assembly; and an adhesion test piece that is bonded to outside of the fluid flow path area and is not involved in sealing by the gasket. With regard to this separator for fuel cell, the adhesive state of the gasket may be estimated by evaluating the adhesive state of the adhesion test piece. With regard to the separator for fuel cell according to this aspect, the adhesion test piece provided separately from the gasket on the separator for fuel cell as the product may be used for evaluation of the adhesive state of the gasket. The adhesion test piece is not involved in sealing of the fluid flow path area, so that the tested separator for fuel cell may be used directly as the product. The separator for fuel cell of this aspect may accordingly have the effect of improving the yield of products.

(2) The separator for fuel cell of the above aspect may further comprise a separator center area placed to face a power generation area of the membrane electrode assembly; a peripheral region extended from the separator center area toward an outer edge; and a first manifold and a second manifold provided in the peripheral region. The fluid flow path area may be an area extended from the first manifold through the separator center area to the second manifold. The gasket may be provided in the peripheral region. The adhesion test piece may be provided outside of the fluid flow path area and may be configured to receive an external force applied as a test for evaluation of an adhesive state of the gasket.

(3) In the separator for fuel cell of the above aspect, the adhesion test piece may be made of an identical material with that of the gasket and may be bonded by an identical bonding procedure with that of the gasket and on a surface identical with a surface where the gasket is bonded. The separator for fuel cell according to this aspect may enable the evaluation result of the adhesive strength of the adhesion test piece to be approximate to the evaluation result of the adhesive strength of the gasket. This may further enhance the reliability for adhesiveness of the gasket.

(4) According to another aspect of the invention, there is provided a manufacturing method of a fuel cell stack by stacking a plurality of membrane electrode assemblies via separators for fuel cell. The manufacturing method of the fuel cell stack may comprise providing the separator for fuel cell with a gasket that is bonded to a position surrounding a fluid flow path area, in which a flow path for a fluid is formed, to seal the fluid flow path area and with an adhesive test piece that is bonded to outside of the fluid flow path area and is not involved in sealing; applying an external force to the adhesion test piece prior to stacking of the separator for fuel cell and evaluating an adhesive state of the adhesion test piece, so as to estimate an adhesive state of the gasket; and upon estimation of good adhesive state of the gasket, stacking the membrane electrode assembly via the separator for fuel cell. The manufacturing method of the fuel cell stack according to this aspect may enable the fuel cell stack to be manufactured after evaluation of the adhesive state of the gasket in the manufacturing process of the fuel cell stack. This may allow for estimation of the adhesive state of the gasket in the manufacturing process and may also allow for the 100% test of the separator for fuel cell.

The invention may be implemented by various aspects, for example, a fuel cell system including the fuel cell stack of the above aspect.

DESCRIPTION OF EMBODIMENTS

A. General Configuration

Figure 1:
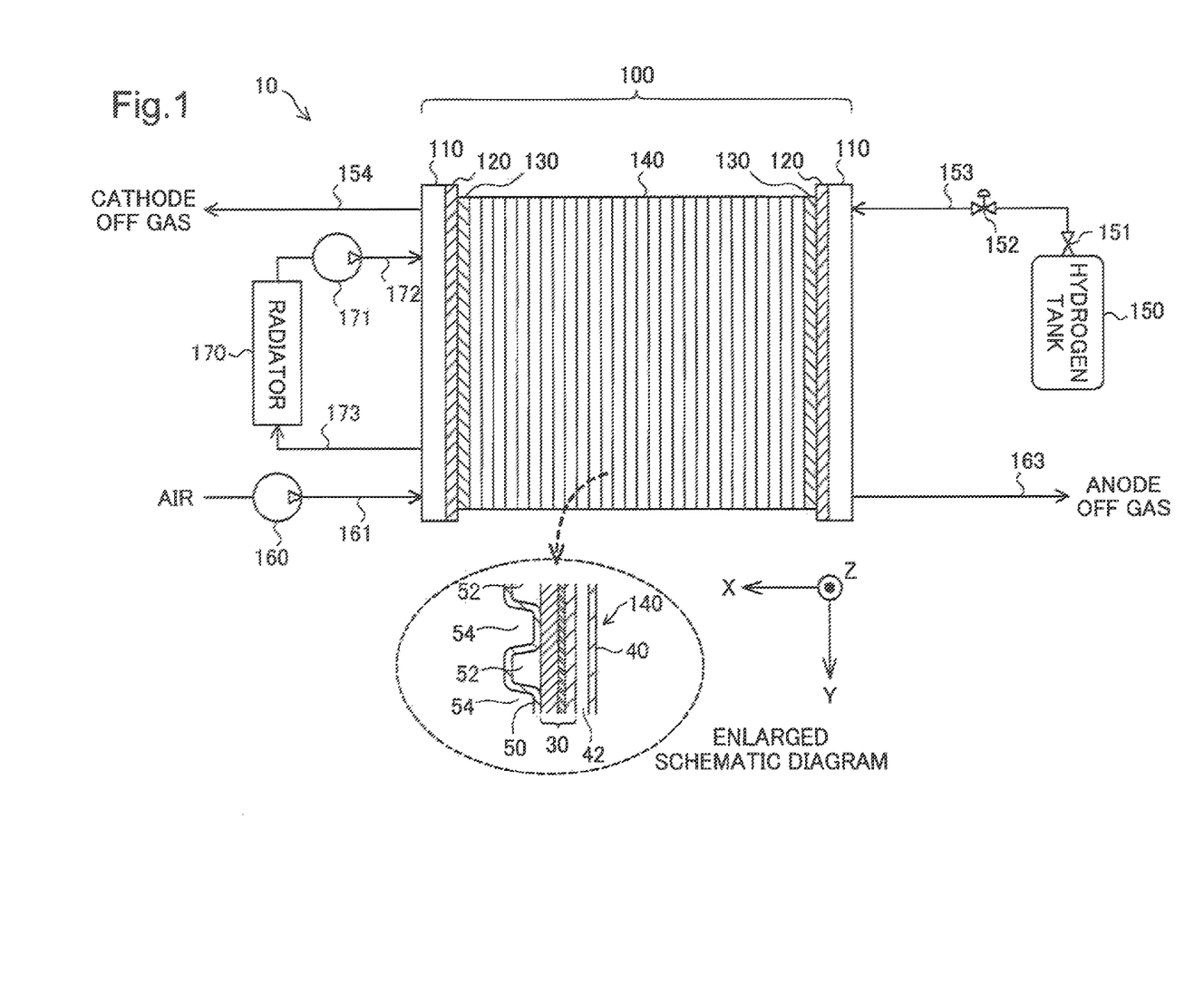
FIG. 1 is a diagram illustrating the general configuration of a fuel cell system according to an embodiment of the invention.

FIG. 1 is a diagram illustrating the general configuration of a fuel cell system 10 according to one embodiment of the invention. The fuel cell system 10 includes a fuel cell stack 100. The fuel cell stack 100 has a stack structure in which an end plate 110, an insulating plate 120, a current collector 130, a plurality of unit cells 140, another current collector 130, another insulating plate 120 and another end plate 110 are stacked in this sequence. This fuel cell stack 100 is mounted on a vehicle such that the stacking direction of the unit cells 140 is a direction (horizontal direction) X perpendicular to a vertical direction Y.

The fuel cell stack 100 receives a supply of hydrogen as a fuel gas supplied from a hydrogen tank 150 that stores high-pressure hydrogen via a shutoff valve 151, a regulator 152 and a piping 153. Unused fuel gas (anode off gas) that is not used in the fuel cell stack 100 is discharged out of the fuel cell stack 100 through a discharge piping 163. The fuel cell system 10 may have a recirculation mechanism configured to recirculate the anode off gas to the piping 153. The fuel cell stack 100 also receives a supply of the air as an oxidizing gas via an air pump 160 and a piping 161. Unused oxidizing gas (cathode off gas) that is not used in the fuel cell stack 100 is discharged out of the fuel cell stack 100 through a discharge piping 154. The fuel gas and the oxidizing gas are also called reaction gases.

Additionally, the fuel cell stack 100 receives a supply of a cooling medium (also called "coolant") that is cooled by a radiator 170 and is supplied via a water pump 171 and a piping 172 for the purpose of cooling down the fuel cell stack 100. The cooling medium discharged from the fuel cell stack 100 is circulated to the radiator 170 via a piping 173. The cooling medium used may be, for example, water, an antifreeze such as ethylene glycol or the air. At a cold start of the fuel cell stack 100, the coolant may be heated by a heater and circulated to warm up the fuel cell stack 100.

In each of the unit cells 140 included in the fuel cell stack 100, a membrane electrode assembly 30 (also called MEA) where an anode and a cathode are formed on respective surfaces of an electrolyte membrane, is placed between a pair of separators or more specifically an anode-side separator 50 and a cathode-side separator 40. The anode-side separator 50 has fuel gas flow paths 52 consisting of a plurality of striped grooves provided on its MEA 30-side surface, and cooling medium flow paths 54 consisting of a plurality of striped grooves provided on an opposite surface opposite to the MEA 30-side surface, as shown in an enlarged schematic diagram of FIG. 1. The cathode-side separator 40 has an oxidizing gas flow path 42 provided on its MEA 30-side surface and defined by a flow path-forming member for a flow of the air. The flow path-forming member may be, for example, expanded metal (not shown). The fuel cell stack 100 of the embodiment is a polymer electrolyte fuel cell stack, and the electrolyte membrane is composed of, for example, a proton-conductive ion exchange membrane made of a solid polymer material such as a fluororesin.

B. Structure of Separator

Figure 2:
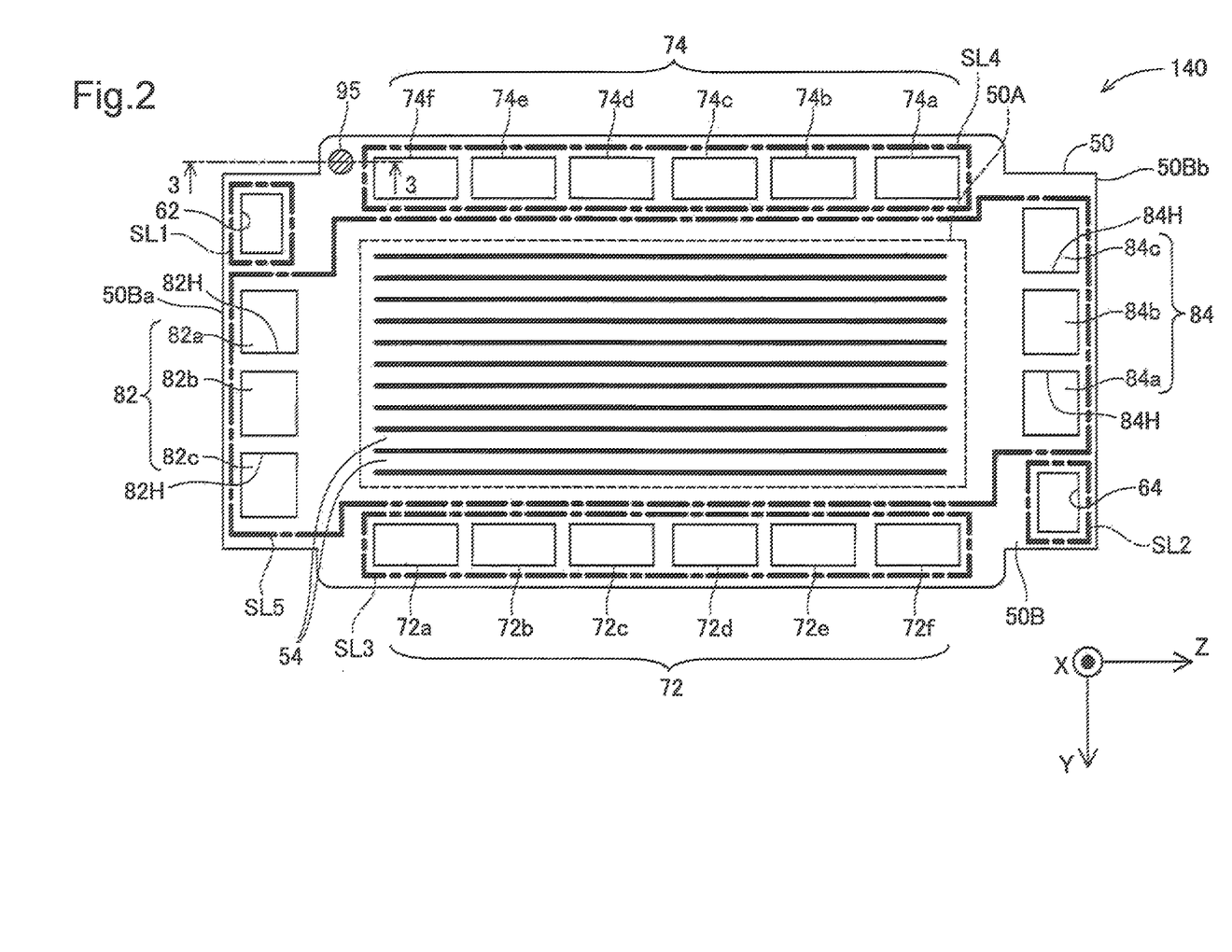
FIG. 2 is a plan view illustrating a stacked unit cell, viewed from an anode-side separator side.

FIG. 2 is a plan view illustrating a stacked unit cell in the fuel cell stack 100 virtually separated in the middle of the stacking direction, viewed from the anode-side separator 50-side. In FIG. 2, the front-rear direction is the stacking direction X, and the top-bottom direction is approximately the vertical direction Y of the fuel cell stack 100. The anode-side separator 50 and the cathode-side separator 40 are composed of members having gas barrier properties and electron conductivity and may be made of, for example, carbon members of, for example, gas-impermeable dense carbon formed by compressing carbon particles or metal members of, for example, press-formed stainless steel or titanium steel. According to the embodiment, the separators 40 and 50 are manufactured by press forming stainless steel.

The anode-side separator 50 includes a separator center area 50A opposed to a power generation area of the MEA 30 and a flat peripheral region 50B extended from the separator center area 50A toward an outer edge. The "power generation area" is an area where electric power is generated in the MEA 30 and is an approximately rectangular area where the fuel gas flows in the MEA 30 or more specifically where the fuel gas flow paths 52 (shown in FIG. 1) are provided in a plane viewed from the stacking direction X. The separator center area 50A is an area corresponding to (matching with) the power generation area in the plane viewed from the stacking direction X. According to this embodiment, the peripheral region 50B is extended toward four directions, i.e., upward in the vertical direction Y, downward in the vertical direction Y, toward one side of a left-right direction Z in the drawing perpendicular to both the vertical direction Y and the stacking direction X, and toward the other side of the left-right direction Z.

The peripheral region 50B has openings provided respectively to form a fuel gas supply manifold 62, an oxidizing gas supply manifold 72, a fuel gas discharge manifold 64, an oxidizing gas discharge manifold 74, a cooling medium supply manifold 82 and a cooling medium discharge manifold 84. These manifolds are formed by stacking the unit cells 140, but each of the unit cells 140 or the anode-side separator 50 alone has only the openings. In the description hereof, these openings are called manifolds with no distinction between the stacked state (i.e., the state that the openings function as manifolds) and the discrete state (i.e., the state that the individual openings are present simply as openings). The fuel gas supply manifold 62 is a flow path configured to distribute hydrogen as the fuel gas supplied to the fuel cell stack 100 into the fuel gas flow paths 52 (shown in FIG. 1) of the respective unit cells 140. The oxidizing gas supply manifold 72 is a flow path configured to distribute the air as the oxidizing gas supplied to the fuel cell stack 100 into the oxidizing gas flow paths 42 (shown in FIG. 1) of the respective unit cells 140. The fuel gas discharge manifold 64 is a flow path configured to collect the unused fuel gas that is not used in the fuel gas flow paths 52 and discharge the collected unused fuel gas out of the fuel cell stack 100. The oxidizing gas discharge manifold 74 is a flow path configured to collect the unused oxidizing gas that is not used in the oxidizing gas flow paths 42 and discharge the collected unused oxidizing gas out of the fuel cell stack 100. The oxidizing gas supply manifold 72 includes six oxidizing gas supply manifolds 72a to 72f, and the oxidizing gas discharge manifold 74 includes six oxidizing gas discharge manifolds 74a to 74f. The respective manifolds 62, 64, 72a to 72f and 74a to 74f have rectangular openings and form reaction gas flow paths extended in the stacking direction X of the fuel cell stack 100. Each of the oxidizing gas supply manifold 72 and the oxidizing gas discharge manifold 74 is divided into a plurality of manifolds or more specifically six manifolds in the embodiment, in order to ensure both the wide opening area for the oxidizing gas and the strength.

The cooling medium supply manifold 82 is provided in a peripheral region 50Ba on the left side in the Z direction, and the cooling medium discharge manifold 84 is provided in a peripheral region 50Bb on the right side in the Z direction. The cooling medium supply manifold 82 is configured to distribute the cooling medium into the respective unit cells 140, The cooling medium discharge manifold 84 is configured to collect the cooling medium discharged from the respective unit cells 140 and discharge the collected cooling medium out of the fuel cell stack 100. The cooling medium supply manifold 82 includes three cooling medium supply manifolds 82a to 82c, and the cooling medium discharge manifold 84 includes three cooling medium discharge manifolds 84a to 84c. The respective manifolds 82a to 82c and 84a to 84c for the cooling medium have rectangular openings and form flow paths extended flow paths extended in the stacking direction X of the fuel cell stack 100. Each of the cooling medium supply manifold 82 and the cooling medium discharge manifold 84 is divided into three manifolds by means of beam elements 82H or 84H, in order to ensure both the wide opening area for the cooling medium and the strength. The number of divisions of the cooling medium supply manifold 82 or the cooling medium discharge manifold 84 is not limited to three but may be another plural number. In another example, only one cooling medium supply manifold 82 and only one cooling medium discharge manifold 84 may be provided.

Additionally, gaskets are placed on the unit cell 140 to form seal lines SL1 to SL5. The seal lines SL1 to SL5 are provided to surround and seal the power generation area and the openings of the respective manifolds in the planar direction in the plane viewed from the stacking direction X in the stacked configuration of the plurality of unit cells 140. The seal lines SL1 to SL5 are shown by thick one dot-chain lines in FIG. 2. The gaskets are formed by injection molding and have cross sections in a convex shape. In the stacked configuration of the plurality of unit cells 140, the gaskets are in close contact with the surface of another adjacent cell 140 to form the seal lines SL1 to SL5. More specifically, the gaskets abut against and come into close contact with the surface of the separator of another unit cell 140. The seal lines SL1 and SL2 are formed to suppress leakage of the fuel gas. The seal lines SL3 and SL4 are formed to suppress leakage of the oxidizing gas. The seal line SL5 is formed to suppress leakage of the cooling medium.

FIG. 2 illustrates the unit cell 140 viewed from the anode side-separator 50-side and more specifically illustrates a plane of the anode-side separator 50 for a flow of the cooling medium in the planar direction. Accordingly, as illustrated, the seal line SL5 for the cooling medium includes the separator center area 50A corresponding to the power generation area in the stacking direction, and the respective manifolds 82a to 82c and 84a to 84c for the cooling medium. In other words, the seal line SL5 for the cooling medium is formed to pass through the outer side of the manifolds 82a to 82c and 84a to 84c provided in the peripheral region 50B of the anode-side separator 50. A plurality of the straight cooling medium flow paths 54 (also shown in FIG. 1) along the planar direction are formed in the separator center area 50A. The cooling medium supplied from the cooling medium supply manifolds 82a to 82c is distributed into the respective cooling medium flow paths 54 in the separator center area 50, flows through the respective cooling medium flow paths 54 and is collected from the respective cooling medium flow paths 54 to the cooling medium discharge manifolds 84a to 84c to be discharged. The cooling medium supply manifolds 82a to 82c correspond to the narrower concept of the "first manifold" described in Summary, and the cooling medium discharge manifolds 84a to 84c correspond to the narrower concept of the "second manifold" described in Summary. An area from the cooling medium supply manifolds 82a to 82c through the cooling medium flow paths 54 to the cooling medium discharge manifolds 84a to 84c (i.e., the openings of the cooling medium supply manifolds 82a to 82c, an area between the openings of the cooling medium supply manifolds 82a to 82c and the cooling medium flow paths 54, the cooling medium flow paths 54, an area between the cooling medium flow paths 54 and the openings of the cooling medium discharge manifolds 84a to 84c and the openings of the cooling medium discharge manifolds 84a to 84c) corresponds to the narrower concept of the "fluid flow path area" described in Summary.

In the fuel cell stack 100, leakage of the gas or leakage of the coolant is not allowed to occur even in one single unit cell 140. Gaskets forming the seal lines SL1 to SL5 (hereinafter called "sealing gaskets") are thus required to have the high reliability for adhesiveness. A gasket for peel test 95 is accordingly provided in the embodiment. The gasket for peel test 95 is provided in the peripheral region 50B on the opposite surface of the anode-side separator 50 that is opposite to the MEA 30-side surface or, in other words, outside of the cooling medium flow paths 54 as shown in FIG. 2. More specifically, the gasket for peel test 95 is provided in an area outside of the respective seal lines SL1 to SL5 in the peripheral region 50B, for example, at an upper left corner in the illustration. This gasket for peel test 95 is used to evaluate the adhesive strength of the sealing gasket. This gasket for peel test 95 corresponds to the narrower concept of "adhesion test piece" described in Summary.

Figure 3:
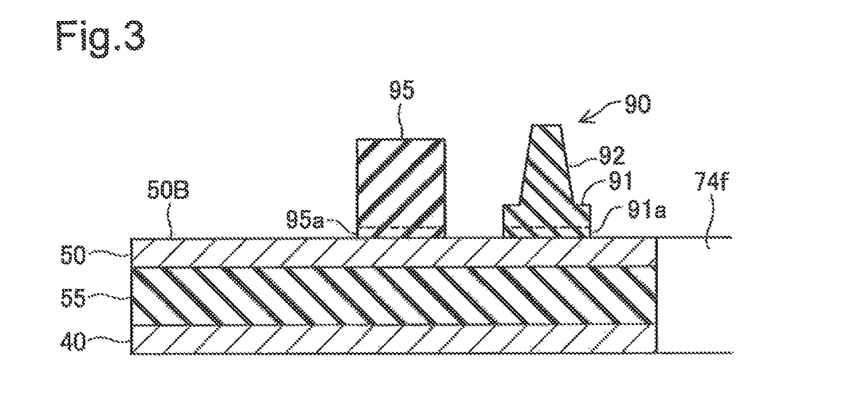
FIG. 3 is a cross sectional view, taken on an arrow 3-3 in FIG. 2.

FIG. 3 is a cross sectional view, taken on an arrow 3-3 in FIG. 2. As illustrated, a rubber layer 55 is placed in the peripheral region 50B (shown in FIG. 1) of the membrane electrode assembly 30 between the cathode-side separator 40 and the anode-side separator 50. The rubber layer 55 serves as a sealing element to prevent leakage of fluid. The rubber layer 55 also serves to suppress the occurrence of cross leakage of the reaction gas. A sealing gasket 90 forming the seal line SL4 and the gasket for peel test 95 are placed on an opposite surface of the anode-side separator 50 that is opposite to its rubber layer 55-side surface.

The sealing gasket 90 includes a base portion 91 that is in surface contact with the peripheral region 50B of the anode-side separator 50, and a protruded portion 92 that is protruded from the base portion 91 and is in contact with a peripheral region of the anode-side separator 50 in the stack of the unit cells 140. The base portion 91 has an adhesive layer (primer layer) 91a on a surface opposite to the protruded portion 92. The sealing gasket 90 is bonded to the peripheral region 50B of the anode-side separator 50 by the adhesive layer 91a. The sealing gasket 90 is composed of a resin member such as fluororubber (FKM), silicon-based resin material, ethylene-propylene-diene rubber (EPDM), urethane rubber, nitrile rubber (NBR), styrene-butadiene rubber (SBR), isoprene rubber (IR) or natural rubber. This sealing gasket 90 corresponds to the narrower concept of "gasket" described in Summary. The sealing gasket 90 shown in FIG. 3 forms the seal line SL4 as described above. The other seal lines SL1 to SL3 and SL5 are also formed by gaskets of the similar material and the similar cross sectional shape to those of the sealing gasket 90.

The gasket for peel test 95 is in a columnar shape and is made of the same material as that of the sealing gasket 90. The gasket for peel test 95 has an adhesive layer (primer layer) 95a that is provided on one end surface thereof and is made of the same adhesive as that of the adhesive layer 91a of the sealing gasket 90. The gasket for peel test 95 is bonded to the peripheral region 50B of the anode-side separator 50 by the adhesive layer 95a. In other words, the gasket for peel test 95 is bonded by the same bonding procedure as that of the sealing gasket 90 and is bonded to the same surface as the surface where the sealing gasket 90 is bonded.

Figure 4A:
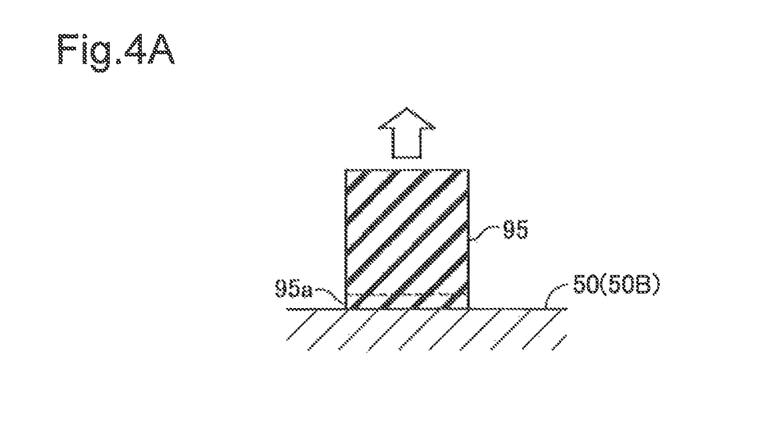
FIG. 4A is a schematic diagram illustrating a process of a peel test.
Figure 4B:
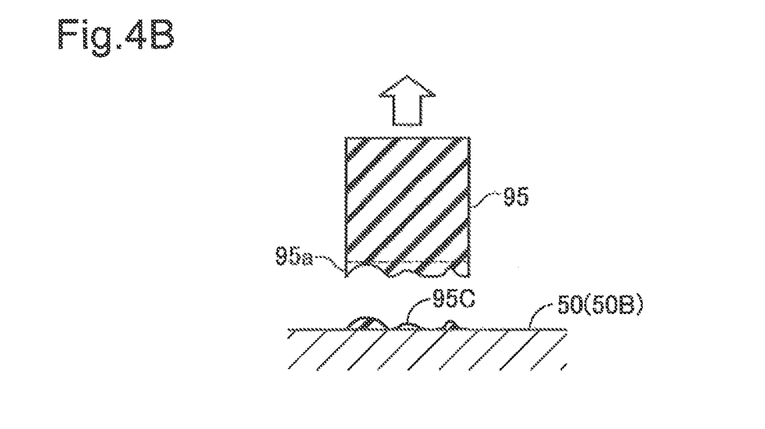
FIG. 4B is a schematic diagram illustrating the process of the peel test.
Figure 4C:
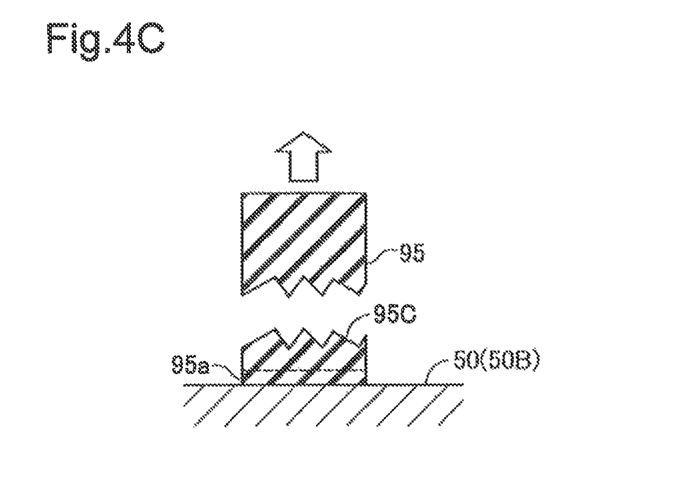
FIG. 4C is a schematic diagram illustrating the process of the peel test.

FIGS. 4A to 4C are diagrams schematically illustrating a peel test (destructive test) performed with respect to the gasket for peel test 95. Each of FIGS. 4A to 4C schematically illustrates a gasket for peel test 95 bonded to the peripheral region 50B of the anode-side separator 50. FIG. 4A illustrates the gasket for peel test 95 under the peel test. FIGS. 4B and 4C respectively illustrate the gaskets for pee test 95 broken in the peel test.

The process of this peel test applies an external force in a protruding direction (upward direction in the illustration) of the gasket for peel test 95 to the gasket for peel test 95, so as to peel off the gasket for peel test 95 from the peripheral region 50B of the anode-side separator 50. More specifically, the process holds the gasket for peel test 95 with tweezers and applies an external pulling force in the protruding direction until the gasket for peel test 95 is broken and separated from the peripheral region 50B. Breakage of the gasket for peel test 95 causes a remaining piece 95C to be left on the anode-side separator 50. The adhesive state of the gasket for peel test 95 is evaluated as described below by observing the remaining piece 95C or the breaking position of the gasket 95 broken and separated.

As shown in FIG. 4B, when the gasket for peel test 95 is broken at the adhesive layer 95a or at the root of the gasket for peel test 95, it is evaluated that the adhesive strength (adhesive state) of the gasket for peel test 95 is significantly reduced. In this case, it may thus be similarly evaluated that the adhesive strength of the sealing gasket 90 is reduced. As shown in FIG. 4C, on the other hand, when the gasket for peel test 95 is broken above the adhesive layer 95a or at a position of the main body of the gasket for peel test 95, it is evaluated that the adhesive strength of the gasket for peel test 95 is sufficiently high. In this case, it may thus be similarly evaluated that the adhesive strength of the sealing gasket 90 is good.

Figure 5:
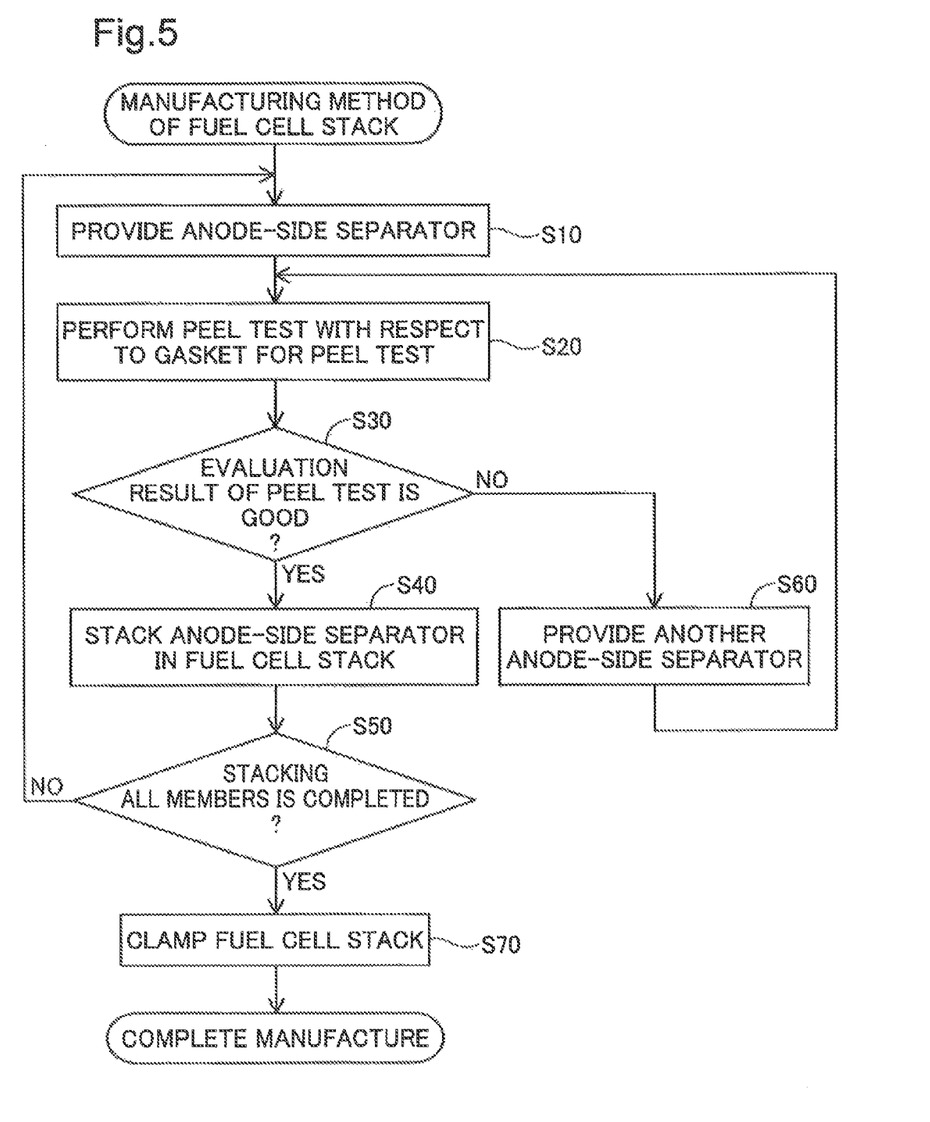
FIG. 5 is a flowchart showing a manufacturing method of a fuel cell stack.

According to the embodiment, this peel test is performed prior to a stacking process that stacks a plurality of the MEAs 30 via the anode-side separators 50 and the cathode-side separators 40. More specifically, the peel test is performed in the process of a manufacturing method of the fuel cell stack 100 (shown in FIG. 5). The process first provides an anode-side separator 50 for stacking (step S10). The gasket for peel test 95 as well as gaskets 90 forming the seal lines are provided on this anode-side separator 50 as described above. The process performs the peel test by the process of FIGS. 4A to 4C (step S20) before the anode-side separator 50 provided for stacking is actually stacked in a fuel cell stack. Stacking the separator or the like in the fuel cell stack means that a large number of separators and MEAs are stacked by using a jig. After all the members are stacked, the respective stacked members are pressed in the compressing direction between the end plates 110 placed on the respective ends to eventually form the stacked configuration. After step S20, the process evaluates the result of this peel test (step S30). When the evaluation result of the peel test shows the good adhesive state (step S30: YES), the process stacks the anode-side separator 50 tested by the peel test together with the MEA 30 and the cathode-side separator 40 required to form each unit cell 140 in the fuel cell stack (step S40). The process then returns to step S10 to repeat the above series of steps until completion of stacking all the members (step S50: NO). When the evaluation result of the peel test shows the poor adhesive state (step S30: NO), on the other hand, the process interrupts the stacking operation described above and provides another separator 50 (step S60). The process then returns to step S20 to repeat the above series of steps. On completion of stacking all the members including the anode-side separators 50 (step S50: YES), the process places the current collectors 130, the insulating plates 120 and the end plates 110 on the respective ends of the stacked unit cells 140 and clamps the end plates 110 on the respective ends with clamping bolts (not shown) (step S70) and completes manufacture of the fuel cell stack 110. The above process performs evaluation of the adhesive state of the gasket for peel test 95 with regard to all the anode-side separators. Evaluation of the gasket for peel test 95 may, however, be performed at a rate of one separator per several separators, at a rate of one separator per each fuel cell stack or at a rate of one separator per each production lot of separators. The rate of the evaluation may be set appropriately according to various conditions, for example, the reliability of separators and the production time. When the evaluation result shows the good adhesive state, the anode-side separator 50 tested by the peel test is used directly as the product. The gasket for peel test 95 is shown as a hatched area in FIG. 2. This hatching means that the remaining piece of the gasket for peel test 95 is left as the remains of the peel test.

C. Advantageous Effects of Embodiment

As described above, the anode-side separator 50 of the embodiment has the gasket for peel test 95 separately from the sealing gaskets 90. The peel test is performed with regard to this gasket for peel test 95, in order to evaluate the adhesive strength of the sealing gaskets 90. Accordingly, the anode-side separator 50 as the product is used as the subject of the peel test, and there is no need to separately provide a separator for test. The anode-side separator 50 of the embodiment is subjected to the peel test in the manufacturing process of the fuel cell stack and, after the peel test, is usable for the fuel cell stack 100. This results in the effect of enhancing the yield of products.

The anode-side separator 50 of the embodiment has the gasket for peel test 95 provided in the peripheral region 50B that is outside of the separator center area 50A. Even when the remaining piece 95C after peeling degrades over time and is separated from the separator surface, this arrangement prevents the remaining piece 95C from entering the fluid flow path and interfering with the flow of the reaction gas or the coolant. Using the gasket for peel test 95 accordingly has no adverse effects on power generation. The tested anode-side separator 50 may thus be used directly as the product without causing any problem. According to this embodiment, the gasket for peel test 95 is made of the same material as that of the sealing gasket 90 and is bonded by the same bonding procedure as that of the sealing gasket 90 (more specifically the bonding procedure using the same adhesive) to the same surface as the surface where the sealing gasket 90 is bonded. This enables the evaluation result of the adhesive strength of the gasket for peel test 95 to be approximate to or even equivalent to, under some conditions, the evaluation result of the adhesive strength of the sealing gasket 90. This further enhances the reliability for the adhesiveness of the sealing gaskets.

The sealing gasket 90 forming the seal line SL1 is bonded to the anode-side separator 50 not by mechanical linkage but by chemical bonding. The adhesive strength differs to vary the reliability for the adhesiveness, depending on the surface conditions of the separator main boy 50 (for example, molecular level material distribution and adhesion state of water content), the composition (for example, different lot or different lots of the respective materials) of the adhesive (primer), the process conditions and the equipment maintenance conditions. A leakage test is generally performed as the 100% test, in order to guarantee the adhesion process. Separately from the leakage test, a peel test is conventionally performed as the sampling test for evaluation of the adhesive strength according to different lots of various materials or different production dates. The procedure of prior art provides in advance a separator for test and performs the peel test using the separator for test prior to supply of an actual product in the manufacturing process. The anode-side separator 50 of the embodiment is, on the other hand, subjected to the peel test in the manufacturing process of the fuel cell stack as described above. This accordingly shortens the total production time of the entire process. The peel test of the anode-side separator 50 of the embodiment is performed in the manufacturing process and can thus be performed as the 100% test. This further enhances the reliability for the adhesiveness in manufacture.

D. Modifications

D1. Modification 1

In the above embodiment, the gasket for peel test 95 is provided at the upper left corner of FIG. 2 in the area outside of the respective seal lines SL1 to SL5 in the peripheral region 50B of the anode-side separator 50. Instead of this configuration, a gasket for peel test may be provided at another position, for example, at an upper right corner, at a lower left corner or at a lower right corner of FIG. 2 in the area outside of the respective seal lines SL1 to SL5.

D2. Modification 2

In the above embodiment, the gasket for peel test 95 is provided on the opposite surface of the anode-side separator 50 that is opposite to its MEA 30-side surface. Instead of this configuration, a gasket for peel test may be provided on the MEA 30-side surface of the anode-side separator 50. Instead, a gasket for peel test may be provided on its MEA 30-side surface of the cathode-side separator 40. In the configuration that the gasket for peel test is provided on the MEA 30-side surface of the anode-side separator 50, the object of evaluation is the adhesive strength of a sealing gasket relative to the MEA 30-side surface of the anode-side separator 50. In the configuration that the gasket for peel test is provided on the MEA 30-side surface of the cathode-side separator 40, the object of evaluation is the adhesive strength of a sealing gasket relative to the MEA 30-side surface of the cathode-side separator 40.

D3. Modification 3

In the above embodiment, the gasket for peel test 95 is made of the same material as that of the sealing gasket 90 that is the object of evaluation for the adhesive strength and is bonded by the same bonding procedure to the same surface as the surface where the sealing gasket 90 is bonded. A gasket for peel test may, however, be made of a different material from that of the sealing gasket 90 that is the object of evaluation and may be bonded by a different bonding procedure or may be bonded to a different surface. In general, the requirement is that there is some relationship between a gasket as an object of evaluation and a gasket for evaluation with regard to the adhesive state. It is, however, preferable that the gasket for peel test is made of the same material as that of the sealing gasket 90 that is the object of evaluation and is bonded by the same bonding procedure on the same surface. This enables the gasket for peel test to provide the more accurate indication of the adhesive state.

D4. Modification 4

In the above embodiment, the test procedure for evaluating the adhesive strength holds and pulls the gasket for test in the protruding direction with tweezers to break the gasket for test. This procedure is, however, not restrictive, and another method may be employed for evaluation. For example, it is not essential to break the gasket for test, as long as the gasket for test can be evaluated for the adhesive strength. In another example, an external force may be applied to the gasket for test by another procedure instead of the procedure using tweezers. Instead of pulling the gasket for test in the protruding direction, an external force may be applied to the gasket for test in a direction parallel to the bonding surface.

D5. Modification 5

In the embodiment and the respective modifications described above, the polymer electrolyte fuel cell is used for the fuel cell. The invention may, however, be applied to various other fuel cells, for example, phosphoric acid fuel cells, molten carbonate fuel cells and solid oxide fuel cells.

The invention is not limited to any of the embodiment and its modifications described above but may be implemented by a diversity of other configurations without departing from the scope of the invention. For example, the technical features of any of the above embodiment and modifications corresponding to the technical features of each of the aspects described in Summary may be replaced or combined appropriately, in order to solve part or all of the problems described above or in order to achieve part or all of the advantageous effects described above. Among the components in the embodiment and the modifications described above, components other than those described in independent claims are additional components and may be omitted appropriately.

INDUSTRIAL APPLICABILITY

The present invention relates to a separator for fuel cell and a fuel cell stack and is applicable to a fuel cell stack, a fuel cell and production thereof.

REFERENCE SIGNS LIST 10 fuel ell
30 membrane electrode assembly
40 cathode-side separator
42 oxidizing gas flow path
50 anode-side separator
50A separator center area
50B peripheral region
52 fuel gas flow path
54 cooling medium flow path
55 rubber layer
62 fuel gas supply manifold
64 fuel gas discharge manifold
72, 72a-72e oxidizing gas supply manifolds
74, 74a-74e oxidizing gas discharge manifolds
82, 82a-82c cooling medium supply manifolds
82H beam element
84, 84a-84c cooling medium discharge manifolds
90 sealing gasket
91 base portion
91a adhesive layer
92 protruded portion
95 gasket for peel test
95a adhesive layer
100 fuel cell stack
110 end plate
120 insulating plate
130 current collector
140 unit cell
150 hydrogen tank
151 shutoff valve
152 regulator
153 piping
154 discharge piping
160 air pump
161 piping
163 discharge piping
170 radiator
171 water pump
172, 173 pipings
Y vertical direction
X stacking direction
Z left-right direction
SL1-SL5 seal lines

The invention claimed is:

1. A separator for fuel cell that is used for a fuel cell and is placed to face a membrane electrode assembly, the separator for fuel cell comprising:
a gasket that is bonded to a position surrounding a fluid flow path area, in which a flow path for a fluid is formed, on a surface of the separator to seal the fluid flow path area from the membrane electrode assembly; and
an adhesion test piece that is provided separately from the gasket, bonded to outside of the fluid flow path area, and is not involved in sealing by the gasket.

2. The separator for fuel cell according to claim 1, further comprising
a separator center area placed to face a power generation area of the membrane electrode assembly;
a peripheral region extended from the separator center area toward an outer edge; and
a first manifold and a second manifold provided in the peripheral region, wherein
the fluid flow path area is an area extended from the first manifold through the separator center area to the second manifold,
the gasket surrounding the fluid flow path area is provided in the peripheral region, and
the adhesion test piece is provided outside of the fluid flow path area and is configured to receive an external force applied as a test for evaluation of an adhesive state of the gasket.

3. The separator for fuel cell according to claim 1, wherein the adhesion test piece is made of an identical material with that of the gasket and is bonded by an identical bonding procedure with that of the gasket and on a surface identical with a surface where the gasket is bonded.

4. A manufacturing method of a fuel cell stack by stacking a plurality of membrane electrode assemblies via separators for fuel cell, the manufacturing method comprising:
providing the separator for fuel cell with a gasket that is bonded to a position surrounding a fluid flow path area, in which a flow path for a fluid is formed, to seal the fluid flow path area and with an adhesive test piece that is bonded to outside of the fluid flow path area and is not involved in sealing;
applying an external force to the adhesion test piece prior to stacking of the separator for fuel cell and evaluating an adhesive state of the adhesion test piece, so as to estimate an adhesive state of the gasket; and
upon estimation of good adhesive state of the gasket, stacking the membrane electrode assembly via the separator for fuel cell.

* * * * *